Sept. 2, 1958  R. SARDESON ET AL  2,850,210
LIQUID MEASURING DEVICE
Filed Aug. 13, 1956  3 Sheets-Sheet 1

INVENTORS
ROBERT SARDESON AND
BY  EUGENE C. WINTER

ATTORNEYS

Sept. 2, 1958   R. SARDESON ET AL   2,850,210
LIQUID MEASURING DEVICE
Filed Aug. 13, 1956   3 Sheets-Sheet 2

INVENTORS
ROBERT SARDESON AND
EUGENE C. WINTER
BY Caswell & Lagaard
ATTORNEYS

Sept. 2, 1958  R. SARDESON ET AL  2,850,210
LIQUID MEASURING DEVICE
Filed Aug. 13, 1956  3 Sheets-Sheet 3
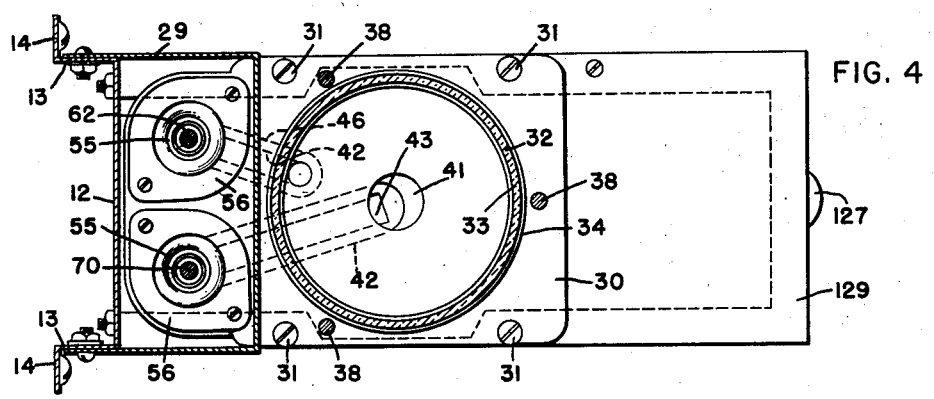
FIG. 4
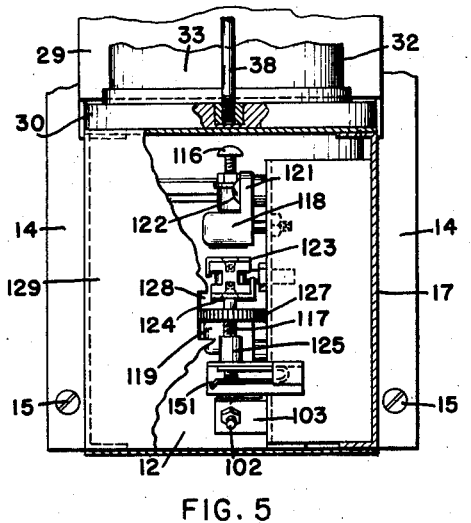
FIG. 5
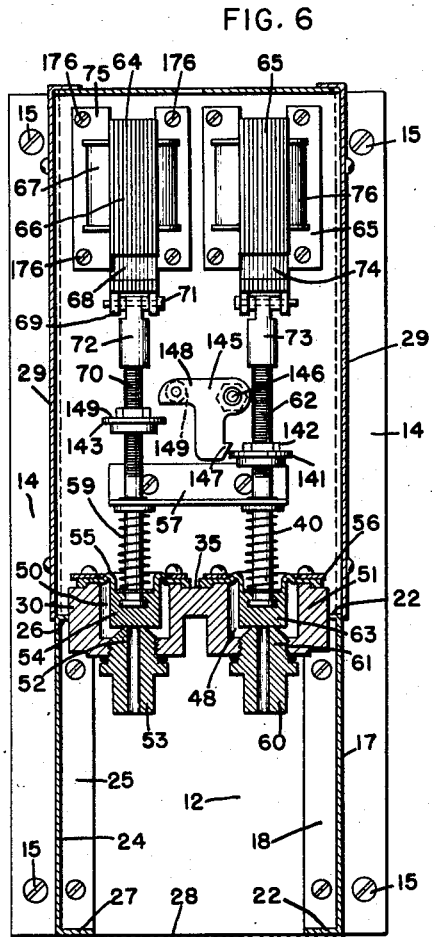
FIG. 6
FIG. 7
INVENTORS
ROBERT SARDESON AND
EUGENE C. WINTER
BY *Caswell & Lagaard*
ATTORNEYS United States Patent Office 2,850,210
Patented Sept. 2, 1958

2,850,210

LIQUID MEASURING DEVICE

Robert Sardeson, Mound, and Eugene C. Winter, Minneapolis, Minn., assignors to Pako Corporation, Minneapolis, Minn., a corporation of Delaware Application August 13, 1956, Serial No. 603,556

6 Claims. (Cl. 222—58)

The herein disclosed invention relates to liquid measuring devices and has for an object to provide a device by means of which small quantities of liquid may be accurately and quickly measured and dispensed.

Another object of the invention resides in providing a device suitable for use in replenishing consumable or exhaustable liquids.

A still further object of the invention resides in providing a measuring device operating on the change of hydrostatic pressure of the liquid in the liquid receptacle.

An object of the invention resides in providing a device utilizing a diaphragm for the bottom of the receptacle and in measuring the force created by the liquid on the diaphragm for determining the quantity of liquid dispensed.

Another object of the invention resides in providing conduits leading to and from the reservoir and having inlet and outlet valves therein and in providing means for rapidly opening and closing said valves.

A still further object of the invention resides in providing a balance operated by the diaphragm, said balance having a beam and provided with resilient means for resisting the movement of the beam by the diaphragm.

Another object of the invention resides in providing magnets associated with the beam and adapted to cause the beam to move with snap action when reaching or leaving either of its extreme positions.

Another object of the invention resides in providing a construction in which the magnets hold the beam immovable until the force on the diaphragm reaches a predetermined value, or the liquid reaches a predetermined height.

An object of the invention resides in providing an electrical switch operated by said beam and solenoids for operating said valve, the solenoid for the inlet valve being energized upon actuation of said switch.

A feature of the invention resides in providing latching means acting on said outlet valve and adapted on momentary actuation thereof to maintain said outlet valve open and to further provide a release therefor controlled by the inlet valve and serving to release said latching means and close the outlet valve upon actuation of the inlet valve.

Other objects of the invention reside in the novel combination and arrangement of parts and in the details of construction hereinafter illustrated and/or described.

In the drawings:

Fig. 4 is a plan sectional view taken on line 4—4 of Fig. 3.

Fig. 5 is an elevational-sectional view taken on line 5—5 of Fig. 3.

Fig. 6 is an elevational-sectional view taken on line 6—6 of Fig. 3.

Fig. 7 is a wiring diagram of the invention.

Figure 1:
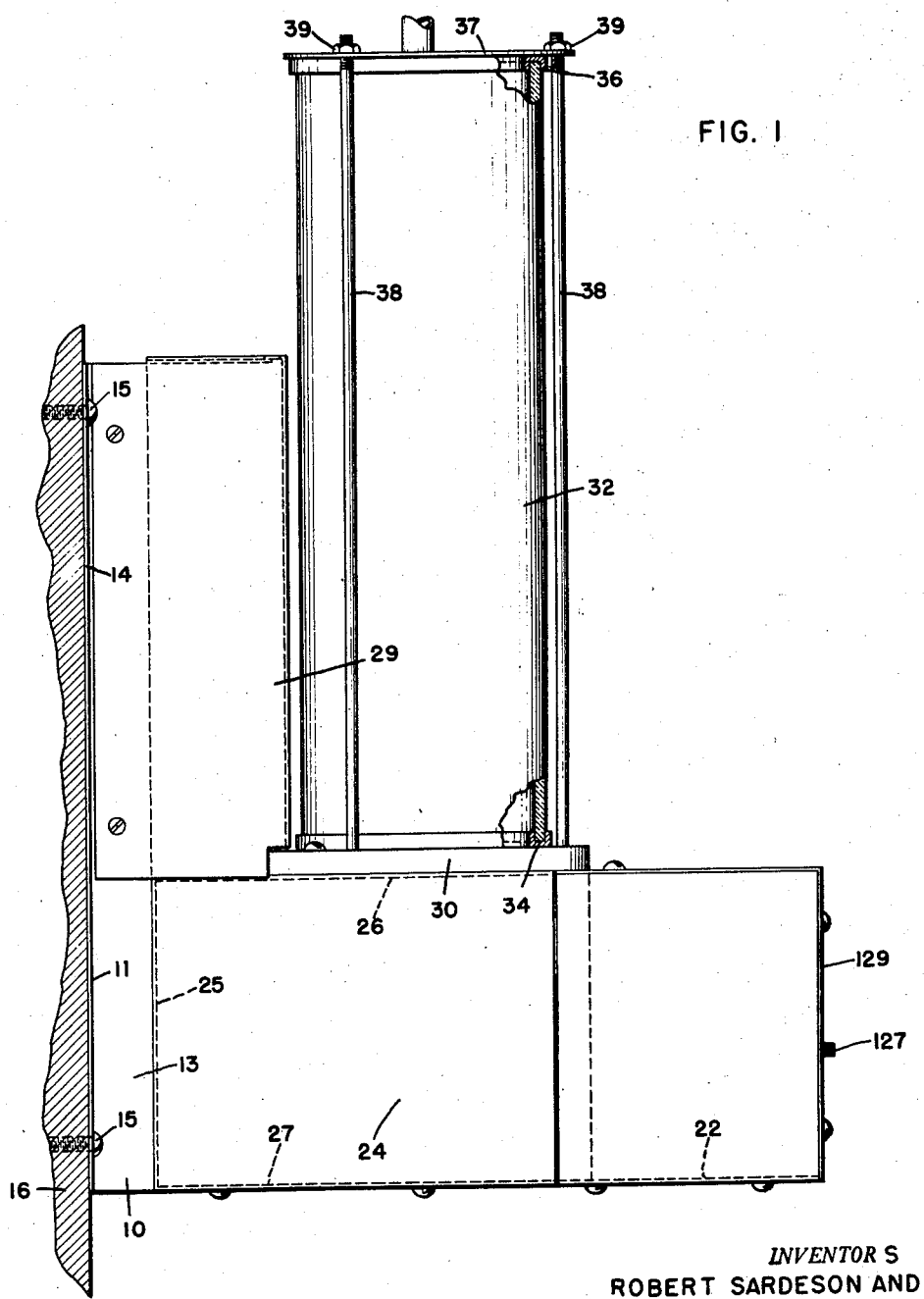
Fig. 1 is a side elevational view of a liquid measuring device illustrating an embodiment of the invention.
Figure 2:
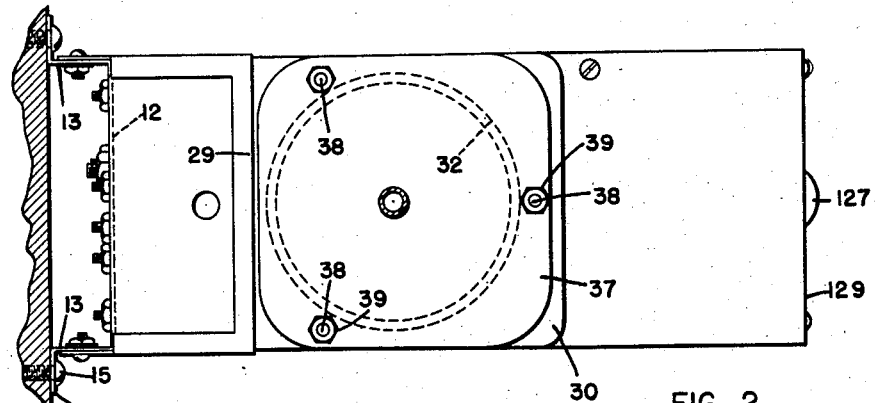
Fig. 2 is a plan view of the structure shown in Fig. 1.
Figure 3:
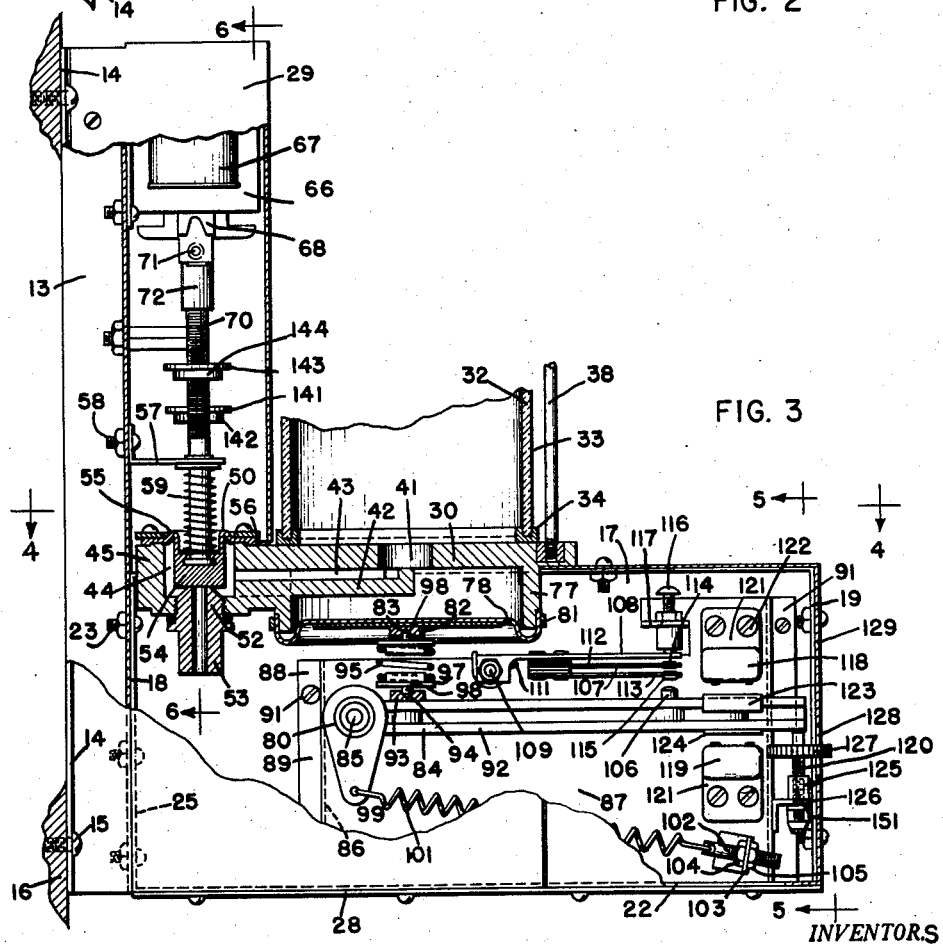
Fig. 3 is an elevational-sectional view taken on line 3—3 of Fig. 2.

The invention consists of a supporting structure 10 best shown in Figs. 1, 2 and 3. This supporting structure consists of a bracket 11 U-shaped in form and which has a web 12 and legs 13 extending outwardly therefrom. The legs 13 are formed with flanges 14 lying in a common plane. The bracket 11 extends vertically and may be mounted on a wall 16 by means of screws 15 which extend through said flanges and are screwed into the wall. Extending outwardly from the lower portion of the bracket 11 is a rear wall 17 which is formed with flanges 18 and 19 at its ends and with flanges 21 and 22 at the top and bottom of the same. The flange 18 is bolted to the web 12 by means of bolts 23. In a similar manner, a front wall 24 is employed, which is constructed similarly to the wall 17 excepting that the same is shorter. This wall is formed with an end flange 25 with an upper flange 26 and with a lower flange 27. The flange 25 is bolted to the web 12 of the bracket 11 in the same manner as the flange 18. A bottom 28 is bolted to the flanges 27 and 22 of the walls 24 and 17 and holds the structure in place.

Mounted on the flanges 21 and 26 of the walls 17 and 24 is a base 30 best shown in Fig. 3. This base is constructed of a plastic material such as a phenol formaldehyde product and is planiform in shape lying directly upon the flanges 21 and 26. Bolts 31 extend through the base 30 and through the flanges 21 and 26 and clamp the base to the supporting structure 10. Mounted on the base 30 is a receptacle 32 which has a cylindrical wall structure 33 formed from a tube of glass. A U-shaped gasket 34 encircles the lower edge of this wall structure and is seated upon the upper surface 35 of the base 30. The upper end of the said wall structure is similarly provided with a U-shaped gasket 36 which also encircles the same. Resting on top of the gasket 36 is a cover 37. Long threaded rods 38 extend through the cover 37 and are screwed into the base 36. These rods have nuts 39 screwed on the upper ends of the same and which engage the cover 37 and clamp the parts together to make the receptacle liquid-tight at the ends of the tubular wall structure.

The liquid to be measured is directed into and out of the receptacle 32 in the following manner and the flow controlled by means of an inlet valve 50 and an outlet valve 51. At the center of the receptacle 32, the base 30 is formed with a circular hole 41 extending through the same. Projecting into this hole is a conduit 42 which has a passageway 43 in the same discharging in an upward direction. This passageway communicates with a valve chamber 44 of the inlet valve 50 formed in an enlargement 45 of the base 30 disposed adjacent the web 12 of the bracket 11. In a similar manner, the conduit 46 is also formed in the base 30 which has a passageway 47 communicating with a valve chamber 48 of the outlet valve 51. This passageway is directed upwardly, as shown in Fig. 4, and discharges near the wall structure 33.

The valve 50 utilizes a valve seat 52 which is screwed into the base 30 and which faces upwardly. This seat is formed with a nipple 53 to which a suitable tube or hose may be connected and which leads to a reservoir containing the liquid to be measured. Operating in conjunction with the seat 52 is a vertically reciprocable valve stem 70. This valve has secured to its lower end a valve member 54. The valve member 54 has formed integral with it a diaphragm 55, the marginal portion of which is clamped to the upper surface 35 of the base 30 by means of a clamp ring 56. The valve stem 70 is guided for reciprocating movement in a guide 57 secured to the web 12 of bracket 11 by means of bolts 58. A compression coil spring 59 encircles the valve stem 70 and engages the upper portion of the valve member 54 and the guide 56 and urges the valve member 54 to a position engaging the valve seat 52 and closing valve 50. Valve 51 is constructed in the same manner as valve 50 and the description thereof will not be repeated. This valve has a valve seat 61 formed with a nipple 60 and a valve stem 62 carrying a valve member 63 operating in the same manner as the valve stem 70 and the valve member 54 of the valve 50. A compression coil spring 40 also urges the valve 51 into closing position. All of these parts are enclosed by means of a cover 29 secured to the legs 13 of the bracket 11.

For operating the valves 50 and 51 two solenoids 64 and 65 are employed. These solenoids are identical in construction and only the solenoid 64 will be described. This solenoid consists of a core structure 66 having a coil 67 mounted on the same. The coil 67 is formed with a central hole, not shown, and in which is slidable an armature 68. The armature 68 is constructed at its lower end with a clevis 69 and which has pivoted to it by means of a pintle 71 a connector 72. The valve stem 55 is threaded throughout the major portion of the same and is screwed into the connector 72. The core structure 66 has attached to it a base plate 75 which is secured to the web 12 of the bracket 11 by means of bolts 176. Valve stem 62 is similarly screwed into a connector 73 actuated by the armature 74 of solenoid 65. This solenoid also has a coil 76 for operating the same. It will readily be comprehended that when either of the coils 67 or 76 are energized that the armatures 68 and 74 are drawn into the solenoid to raise the valve stems 55 and 62 and open the respective valves.

Extending downwardly from the base 30 is an annular neck 77 of a diameter substantially equal to the inner diameter of the receptacle 32. Extending across this neck is a flexible diaphragm 78 and which has attached to it a circular plate 79. The diaphragm 78 is secured in place on the neck 77 by means of an annular clamp 81. Attached to the underside of the plate 79 is a seat 82 having a conical-shaped socket 83 in the same. Immediately below the diaphragm 78 is a beam 84. This beam is pivoted on a shaft 85 which is attached to a bracket 86. A pair of ball bearings 80 acting between said shaft and beam serves to support the beam for swinging movement. Bracket 86 has a body portion 87 with legs 88 extending outwardly therefrom. Flanges 89 issue from said legs and lie in a common plane. These flanges overlie the rear wall 17 and are attached thereto by means of bolts 91. The beam 84 is constructed with an arm 92 which has attached to it a seat 93. This seat is formed with a conical-shaped socket 94. A compression coil spring 95 has caps 96 and 97 attached to the ends thereof. These caps are constructed with fulcrums 98 which are adapted to be received in the sockets 85 and 94 and are adapted to transmit pressure from the diaphragm 78 to the beam 92.

The beam 84 has a depending arm 99 which has secured to the lower end of the same one end of a tension coil spring 101. The other end of this spring is attached to a screw 102. This screw passes through a lug 103 secured to the body portion 87 of bracket 86. Nuts 104 and 105 screwed on this screw and engaging the lug 103 serve to adjust the spring tension of the said spring and correspondingly the balance of the beam.

The arm 92 of the beam 84 has attached to it a button 106 which is adapted to operate a switch 107. Switch 107 consists of a support 108 which is pivoted by means of a pintle 109 bolted to the body portion 87 of bracket 86. A torsion spring 111 having one end connected to the bracket 86 and the other end to the support 108 tends to swing the said support in a counter clockwise direction. Attached to the support 108 are two leaf spring switch arms 112 and 113 which are insulated frm one another and from the support 108 and which carry contacts 114 and 115 adapted to close and complete a circuit through the solenoid 64. The switch arm 112 is rigid while the switch arm 113 is flexible and constitutes the movable member of the switch. Upward swinging of the entire switch 107 is limited by means of an adjusting screw 116 screwed into a bracket 117 secured to the body 87 of the bracket 86. The switch 107 serves as a flow control means for controlling the output of the device.

Operating in conjunction with the beam 84 are two permanent magnets 118 and 119 which are formed with flanges 121 secured to said body portion 87 by means of screws 122. Mounted on the arm 92 of the beam 94 are armatures 123 and 124. The magnets 118 and 119 are normally some distance from the armatures 123 and 124 so that appreciable movement of the beam 84 can be procured. When, however, the beam approaches either of its extreme positions, it will rapidly move with snap action to close or open the switch 107.

For the adjustment of the amount of liquid measured and dispensed an adjusting screw 120 is provided. This screw is screwed into a block 125 which in turn is mounted on a bracket 126 secured to the leg 88 of bracket 86. The screw 122 has a manipulating head 127 which extends out through a slot 128 formed in a cover 129 enclosing the space in which the switch 107 is located.

Screwed on the threaded valve stem 62 of valve member 51 is a collar 141. This collar may be adjusted vertically along said valve stem and held in position by means of lock nut 142. Similarly, mounted on the valve stem 62 of the valve 50 is another collar 143 which may be adjusted vertically with respect to said valve stem and which is held in adjusted position by means of a lock nut 144. Cooperating with the collars 141 and 143 is a latch 145 which is pivoted on a stud 146 mounted on the bracket 11. This latch hangs vertically and is formed at its lower end with a hook 147 adapted to engage under the collar 141 which serves as a latching member and to hold the valve 51 in open position. The said latch has an arm 148 and which extends outwardly therefrom and in the path of movement of the collar 143. This arm, when engaged by said collar, moves the hook 147 out of engagement with the collar 141 and releases the valve stem 62 thereof to permit of closing of the valve. A weight 149 attached to the end of the arm 148 serves to urge the hook 147 into engagement with collar 141.

Fig. 7 shows a wiring diagram of the invention. Electrical energy is derived from a line 131—132 which may be connected to any suitable source of electrical energy. A conductor 133 is connected to the side 132 of the line and to one end of each of the coils 67 and 76 of the solenoids 64 and 65. The other end of the coil 76 of solenoid 64 is connected by means of a conductor 134 to a switch 135 which in turn is connected by another conductor 136 to the other side 131 of the line. Switch 135 is a manually operated switch and serves as initiating means to initiate operation of the entire device. The other end of the coil 67 of solenoid 64 is connected by means of a conductor 137 to a switch arm 112 of the switch 107. The other switch arm 113 of this switch is connected by means of conductor 138 to the side 131 of the line. A condenser 139 shunts the switch 107.

The method of operating the invention is as follows: The receptacle 32 is normally filled to the desired height with the liquid to be dispensed. Switch 135 may be a manually controlled switch, or, if desired, a switch controlled in accordance with the use to which the device is to be put. Where the device is used for replenishing consumable liquid or an exhaustable liquid, control means such as a float or other device sensitive to the condition of the liquid may be used to operate said switch 135. Upon closure of this switch, a circuit in established from the side 131 of the line through conductor 136, the coil 76 of solenoid 65 and the conductor 133 back to the side 132 of the line. As appears from Fig. 6, the armature 74 of relay 65 is drawn into the core structure thereof and the valve member 63 of valve 51 raised. At the same time, the collar 141 on valve stem 62 is moved above the hook 147 and said hook through the weight 149 is brought beneath said collar to latch the valve in open position. Liquid now flows out of the receptacle 32 through the outlet passageway 47, through the valve 51, and is discharged from the device through the nipple 60 of the outlet valve 51. The flow continues until the hydrostatic pressure of the liquid in receptacle 32 is lowered to the desired degree. When this occurs, the pressure on the beam 84 is reduced and the force exerted by the spring 101 and the magnet 118 is sufficient to cause the arm 92 of said beam to move upwardly. This closes switch 107. A circuit is now established from the side 132 of the line through coil 67, through conductor 137, through said switch and through conductor 138 back to the other side 131 of the line. Solenoid 64 is now energized and the armature 68 thereof is drawn upwardly. This opens the valve 50 but at the same time the collar 143 on valve stem 62 engages the arm 148 of latch 145 and disengages the hook 147 from the collar 141. Spring 64 now quickly closes valve 51. The flow through nipple 60 is now terminated and fluid flows from nipple 53 through valve 50. The fluid leaving this valve passes through passageway 43 and through the hole 41 in the base 30 and into the interior of the receptacle 32. The liquid then rises until the hydrostatic pressure in said receptacle is great enough to overcome the force exerted by the magnet 118 and spring 101. The beam 84 now drops and the switch 107 is opened. This deenergizes coil 67 and the armature 68 thereof drops through its own weight and through the action of the spring 59 of the valve 50. The device is now reset and the receptacle filled to the desired amount and ready to be again operated. Adjustment of the maximum liquid in the receptacle 32 is procured by adjustment of the screw 116. The amount of liquid to be dispensed is similarly adjusted by means of the head 127 of screw 117.

The advantages of the invention are manifest. The device is fully automatic once the same has been actuated and a measured quantity of liquid is dispensed therefrom. By utilizing the device with a switch controlled by the demand for liquid, manual operation becomes unnecessary. The device is positive in action and extremely accurate, measuring out quantities of liquid with less variation than where the liquid is measured by volume. The transition between discharge and intake occurs so rapidly that no appreciable amount of liquid flows after the inlet valve has been opened.

Changes in the specific form of the invention, as herein described, may be made within the scope of what is claimed without departing from the spirit of the invention.

Having described the invention, what is claimed as new and desired to be protected by Letters Patent is:

1. In a liquid measuring device, a supporting structure, a receptacle having a chamber for the liquid to be measured and carried by said supporting structure, pressure responsive means connected to said receptacle near its lower end and subject to the pressure of the liquid at such locality, said pressure responsive means having a movable member, means forming an inlet passageway and an outlet passageway communicating with said chamber, an inlet valve and an outlet valve in said passageways, closing means yieldingly urging said inlet valve into closing position, closing means yieldingly urging said outlet valve into closing position, control means associated with said outlet valve and upon actuation opening said outlet valve, control means associated with said inlet valve and upon actuation opening said inlet valve, said last named control means having a movable part moved by the movement of the movable member of the pressure responsive means, a latching member movable with said outlet valve, a latch engageable with said latching member and mounted on said supporting structure for movement into and out of engagement with said latching member and a latch disengaging member movable with said inlet valve and moving said latch out of engagement with said latching member to close the outlet valve upon opening of said inlet valve.

2. In a liquid measuring device, a supporting structure, a receptacle having a chamber for the liquid to be measured and carried by said supporting structure, pressure responsive means connected to said receptacle near its lower end and subject to the pressure of the liquid at such locality, said pressure responsive means having a movable member, means forming an inlet passageway and an outlet passageway communicating with said chamber, an inlet valve and an outlet valve in said passageways, initiating means controlling the opening of said outlet valve, control means controlling the opening of said inlet valve, said valves having movable valve stems, resilient means yieldingly urging said valves into closing positions, a collar on each of said valve stems, a latch pivoted to said supporting structure and engageable with the collar on the stem of said outlet valve, and means on said latch engageable with the collar on the stem of said inlet valve for disengaging said latch from said first named collar to close said outlet valve when the inlet valve is opened.

3. In a liquid measuring device, a supporting structure, a receptacle having a chamber for the liquid to be measured and carried by said supporting structure, pressure responsive means connected to said receptacle near its lower end and subject to the pressure of the liquid at such locality, said pressure responsive means having a movable member, means forming an inlet passageway and an outlet passageway communicating with said chamber, an inlet valve and an outlet valve in said passageways, initiating means controlling the opening of said outlet valve, control means controlling the opening of said inlet valve, said valves having reciprocating parallel valve stems, resilient means yieldingly urging said valves into closing positions, a collar on each of said valve stems, a latch pivoted to said supporting structure near the valve stem for the outlet valve, an arm on said latch extending in the direction of said valve stem and having a hook on the same engageable with the collar for said outlet valve and adapted to hold said outlet valve open, and an arm on said latch extending transversely of said first arm and engageable with the collar of said inlet valve to disengage the latch from the collar of the outlet valve and close the outlet valve upon opening of the inlet valve.

4. In a liquid measuring device, a supporting structure, a receptacle having a chamber for the liquid to be measured carried by said supporting structure, said receptacle having an opening near the lower portion thereof, a flexible diaphragm covering said opening and subject to the pressure of the liquid in said receptacle at the locality thereof, a beam pivoted to said supporting structure and having two arms one arm being connected to said diaphragm, yieldable resisting means connected to the other arm of said beam, a magnet mounted on said supporting structure, a keeper mounted on said beam and movable toward and from said magnet as the beam swings, and flow control means controlling the flow of liquid from the receptacle operated by said beam said control means having a movable member moving by means of said magnet with a snap action to a final position.

5. In a liquid measuring device, a supporting structure, a receptacle having a chamber for the liquid to be measured carried by said supporting structure, said receptacle having an opening near the lower portion thereof, a flexible diaphragm covering said opening and subject to the pressure of the liquid in said receptacle at the locality thereof, a beam pivoted to said supporting structure and having two arms one arm being connected to said diaphragm, yieldable resisting means connected to the other arm of said beam, magnets mounted on said supporting structure on opposite sides of one of said arms, keepers mounted on the denoted arm and movable toward and from said magnets as the beam swings, and flow control means controlling the flow of liquid from the receptacle operated by said beam said control means having a movable member moving by means of said magnets with a snap action to either of its final positions.

6. In a liquid measuring device, a supporting structure, a receptacle having a chamber for the liquid to be measured carried by said supporting structure, said receptacle having an opening near the lower portion thereof, a flexible diaphragm covering said opening and subject to the pressure of the liquid in said receptacle at the locality thereof, a beam pivoted to said supporting structure and having two arms one arm being connected to said diaphragm, a spring acting between said other arm of said beam and said supporting structure, magnets mounted on said supporting structure on opposite sides of one of said arms, keepers mounted on the denoted arm and movable toward and from said magnets as the beam swings, flow control means controlling the flow of liquid from the receptacle operated by said beam said control means having a movable member moving by means of said magnets with a snap action to either of its final positions, and adjusting means at one end of said spring adjustable to vary the force of the spring exerted on said beam.

References Cited in the file of this patent
UNITED STATES PATENTS

| | | |
|---|---|---|
| 1,516,999 | Evans | Nov. 25, 1924 |
| 1,786,878 | Van Keuren | Dec. 30, 1930 |
| 1,981,354 | Goerg | Nov. 20, 1934 |
| 2,142,902 | Kempton | Jan. 3, 1939 |
| 2,273,180 | DeCastro | Feb. 17, 1942 |
| 2,382,695 | DeGiers | Aug. 14, 1945 |